United States Patent
Barach et al.

(10) Patent No.: US 6,470,013 B1
(45) Date of Patent: Oct. 22, 2002

(54) USE OF ENHANCED ETHERNET LINK_LOOP PACKETS TO AUTOMATE CONFIGURATION OF INTELLIGENT LINECARDS ATTACHED TO A ROUTER

(75) Inventors: David R. Barach, Boxboro, MA (US); John A. DeNisco, Malden, MA (US); Robert J. Goguen, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/170,402

(22) Filed: Oct. 13, 1998

(51) Int. Cl.[7] .............................................. H04L 12/56
(52) U.S. Cl. ...................................... 370/392; 370/401
(58) Field of Search ................................ 370/389, 392, 370/401, 395.52, 393, 402, 475

(56) References Cited

U.S. PATENT DOCUMENTS

| | | | |
|---|---|---|---|
| 4,437,087 A | 3/1984 | Petr | 340/347 |
| 4,562,353 A | 12/1985 | Del Medico | 250/363 |
| 4,677,423 A | 6/1987 | Benvenuto et al. | 340/347 |
| 4,750,136 A | 6/1988 | Arpin et al. | 364/514 |
| 4,769,810 A | 9/1988 | Eckberg, Jr. et al. | 370/60 |
| 4,769,811 A | 9/1988 | Eckberg, Jr. et al. | 370/60 |
| 4,922,486 A | 5/1990 | Lidinsky et al. | 370/60 |
| 4,979,174 A | 12/1990 | Cheng et al. | 371/41 |
| 5,003,595 A | 3/1991 | Collins et al. | 380/25 |
| 5,072,449 A | 12/1991 | Enns et al. | 371/37.1 |
| 5,128,945 A | 7/1992 | Enns et al. | 371/37.1 |
| 5,287,103 A | 2/1994 | Kasprzyk et al. | 340/825.52 |
| 5,313,454 A | 5/1994 | Bustini et al. | 370/13 |
| 5,434,863 A | 7/1995 | Onishi et al. | 370/85.13 |
| 5,517,620 A | 5/1996 | Hashimoto et al. | 395/200.15 |
| 5,644,713 A | 7/1997 | Makishima | 395/200.01 |
| 5,675,741 A | 10/1997 | Aggarwal et al. | 395/200.12 |
| 5,745,699 A | 4/1998 | Lynn et al. | 395/200.75 |
| 5,751,971 A | 5/1998 | Dobbins et al. | 395/220.68 |
| 5,764,756 A | * 6/1998 | Onweller | 370/352 |
| 5,796,953 A | 8/1998 | Zey | 395/200.57 |
| 5,799,016 A | * 8/1998 | Onweller | 370/401 |
| 5,815,668 A | * 9/1998 | Hashimoto | 370/401 |

OTHER PUBLICATIONS

"Routing in the Internet," downloaded Jul. 20, 1998.
"Simple Network Management Protocol," downloaded Jul. 20, 1998.

* cited by examiner

Primary Examiner—Chau Nguyen
Assistant Examiner—Soon-Dong Hyun
(74) Attorney, Agent, or Firm—Hamilton Brook Smith & Reynolds, P.C.

(57) ABSTRACT

A technique for configuring address information automatically for intelligent port cards such as in a cell multiplexer, router, or other internetwork device. A maintenance or control processor is included in the device together with a number of, for example, line and trunk units. The line and trunk units are loaded, monitored, and controlled by the controller via a backplane network. The backplane network must be assigned a subnet address which does not conflict with the management network interface also on the controller. In order to accomplish this, a LINK_LOOP broadcast packet is periodically sent over the backplane network containing the IP subnet address of the current master system controller. Line and trunk cards in a configuration state therefore wait to hear such a datagram configure their own IP addresses and to acquire the system controller IP address based on the message contents and then are able to initiate IOS IPC protocol over the backplane network as required. The invention eliminates the need for customers to configure the system controller's backplane management internet IP address, providing increased reliability and ease of use, as well as automatic rendevous with current controller in charge in a failure event.

14 Claims, 3 Drawing Sheets

USE OF ENHANCED ETHERNET LINK LOOP PACKETS TO AUTOMATE CONFIGURATION OF INTELLIGENT LINECARDS ATTACHED TO A ROUTER

FIELD OF THE INVENTION

This invention relates to digital communication systems and in particular to a technique for automatically configuring system components.

BACKGROUND OF THE INVENTION

The past decade has seen a tremendous expansion in the deployment of network computing technologies. As organizations have realized cost benefits and productivity gains through their widespread use, they began expanding existing networks almost as rapidly as new products became available. In the past several years, growing pains from this expansion have continued to be felt, especially by those who have deployed different and sometimes incompatible technologies and products.

The typical computer network includes several different types of internetwork elements that permit an end node or user node, such as a personal computer (PC), to be connected to other computer equipment, such as a host computer or service provider. The network typically also may include a sophisticated suite of internetworking devices such as stand alone routers, router modules for shared-media hubs, switches, file servers, multi service wide area network (WAN) access switches, asynchronous transfer mode (ATM) capable multiplexers, and other devices.

The primary problems associated with network expansion include day-to-day network operation management, as well as strategic network growth planning. Specifically, each new network technology typically requires its own set of experts to operate and maintain. Staffing requirements for managing large networks created a crisis resulting in the development of automated network management tools that may be integrated across diverse environments.

One such automated management tool which has enjoyed success is the Internetwork Operating System (IOS™) software available from Cisco Systems of San Jose, Calif. Cisco's IOS software is a unifying thread that connects otherwise disparate hardware, providing security, reliability, and investment protection in the face of network growth, change and new applications. IOS is a remote process protocol using messages in the UDP/IP format.

Ideally, the appropriate components of the IOS software are installed in each internetwork device to create a single, unified infrastructure to manage resources and thereby distribute the network intelligence.

The management services provided by an operating system such as IOS provide such features as:

setting up and configuring of networking devices to monitor activity and to administrate enabling network services for multicast, multimedia, and other applications;

performing optimization functions for bandwidth management, load sharing over multiple links, and congestion control; and troubleshooting to find and resolve problems quickly through automated alarms and other methods.

IOS software thus provides the management services capabilities to control the network on all levels, from physical port configuration to advanced application support.

Even with the adaptation of IOS software or its equivalent, however, network configuration is still an issue. For example, the fewer the number of operator controlled steps needed to configure a particular network device, the easier the job of system administration is. However, each internetwork device must still typically be at least subjected to some initial setup procedure.

SUMMARY OF THE INVENTION

Description of the Problem

For example, internetwork devices such as routers, switches, multiplexers, hubs, bridges, and the like typically provide a separate interface such as an Ethernet type connection, to permit them to communicate with management level services. This communication path is typically separate from the path for the network traffic channels. Indeed, special protocols have been developed for IOS and other management type software. These protocols typically assume that each internetwork entity has a network layer address such as an Internet Protocol (IP) address assigned to it. Unfortunately, such internetwork devices typically control or include multiple elements such as line units and trunk units which are ideally individually controllable from the management level perspective of the entire network.

It would, therefore, be advantageous to physically separate network level addresses for the external network management interface from the addresses used for communication among the internal elements within an internetwork device itself.

Furthermore, the internetwork device should be able to automatically configure itself as much as possible, requiring as little customer intervention as possible. Therefore, from the customer's perspective, an internetwork device should appear to require only a single network address; however, there should be from an internal perspective more than one available address, to efficiently route management level messages internally, and to prevent a possibly catastrophic failure of the device should a management level message be improperly routed.

Furthermore, the provisions for addressing should be such that the internetwork device may be arranged in a redundant configuration as easily as possible, again without complicating the customer's configuration requirements.

Any such solution for assigning addresses should also be simple and inexpensive as possible since many internetwork devices such as routers, do not contain sophisticated computing equipment such as personal computers, but rather contain only simple controller-like processors.

BRIEF DESCRIPTION OF THE INVENTION

The present invention is a technique for implementing an addressing scheme within an internetwork device in which internal or other locally controlled elements such as line units and trunk units may be assigned individual addresses. The internetwork device contains a subnetwork interconnecting the internal elements such as via an Ethernet. The internetwork device also includes a second network port that is typically interfaced to a customer management network. The device automatically provides a network address such as an Internet Protocol (IP) address for the management interface, as well as addresses for the internal elements which do not conflict with one another.

In particular, a network manager provisions an address for the internetwork device on the management network as in a manner which is typically the same as assigning addresses for any network device. Once the management network address is assigned, a controller within the internetwork device assigns a subnet address for the internal backplane network which does not conflict with the subnet address of the assigned management address.

In order for the internal port interface devices, such as the trunk cards and line cards, to discover their own address, a controller within the internetwork device sends a broadcast packet message that advertises its own internal subnet address. Each internal port interface device then listens for such broadcast messages and configure its own address accordingly. The port interface devices may then attempt to initiate management protocol commands, such as IOS type commands, over the management interface.

The invention has several advantages. In particular, the customer does not need to configure the system controller's backplane management addresses. Rather, the customer only needs assign the internetwork device a single subnet address within the context of the customer's own management network.

The technique also supports a mode whereby the internal port interface devices may correctly react to a redundant controller fail over condition. In the redundant configuration, the internal port interface devices detect the fail over condition of the controller and can rendevous with a current controller in charge. This approach avoids difficulties with prior art static assignment of addresses to line cards and other schemes whereby a manager must provision an address for each individual entity within the internetwork device.

DETAILED DESCRIPTION OF A PREFERRED EMBODIMENT

Figure 1:
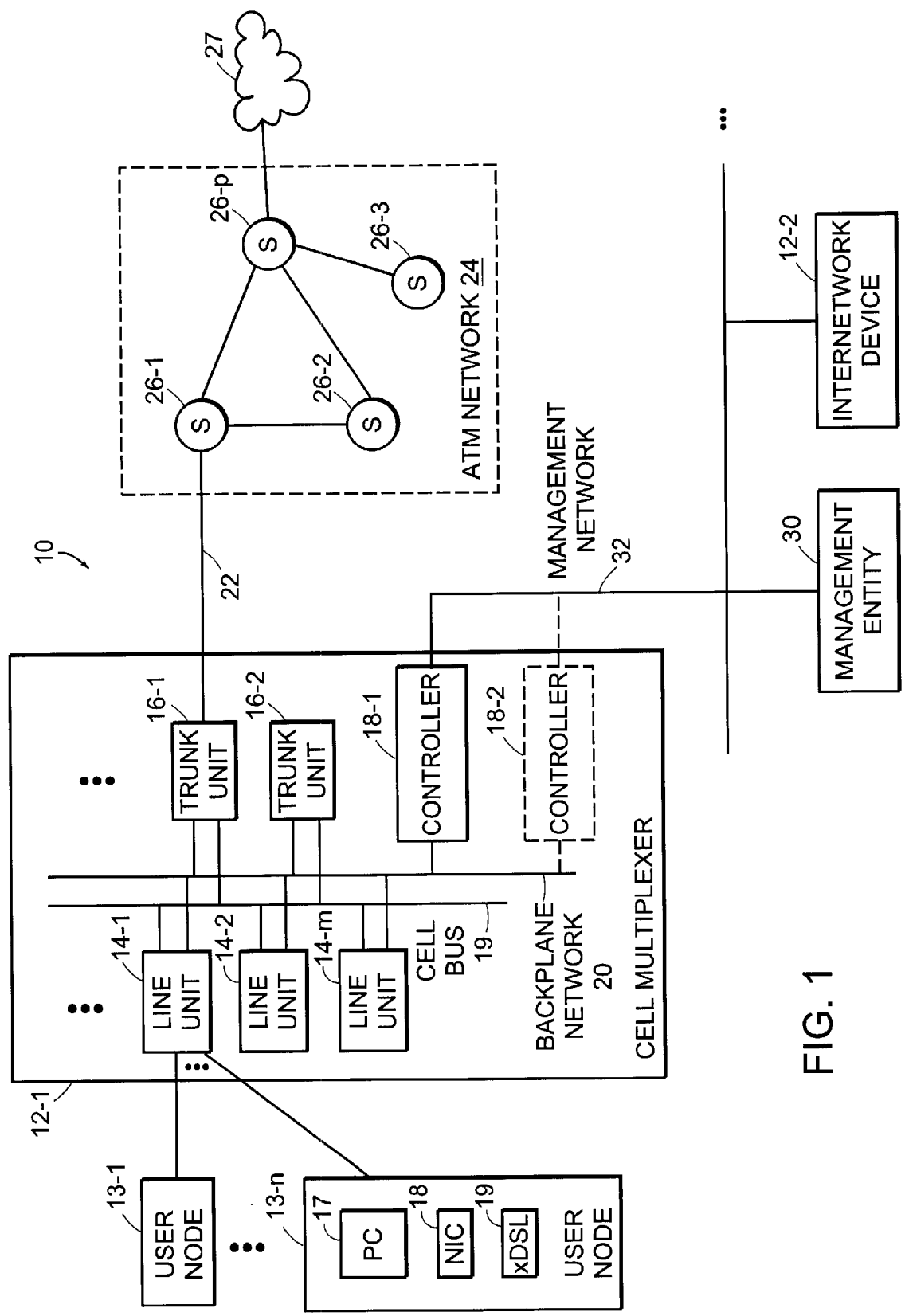
FIG. 1 is a block diagram of a network device such as a cell multiplexer at a high level implementing an addressing scheme according to the invention.

Turning attention now to the drawings more particularly, FIG. 1 is a high level block diagram of a communication system 10 which makes use of an internetwork device 12 that assigns network addresses to internal elements such as port interfaces 14, 16 according to the invention. The communication system 10 may, for example, be used by an Internet Service Provider (ISP) to provide access to the Internet for a number of different user nodes 16-1, . . . , 16-n. It should be understood, however, that the system 10 may also be other various types of communication networks, including private networks and the like.

In the illustrated arrangement, user nodes 13-1, . . . , 13-n (collectively "the user nodes 13") each contain equipment such as personal computers 17. The personal computers 17 in turn include suitable network communication equipment such as a network interface card (NIC) 18, or other data converter equipment, to enable the user node 13 to communicate data over the network 10. In the illustrated example, the user node 13-n makes use of a digital subscriber line (xDSL) type communication interface 19.

The network device 12-1 shown is a type of connection equipment referred to as a cell multiplexer or access node 12. The access node 12 (which also may be a concentrator, communication controller, multiplexer, service access shelf, gateway, bridge, router, or other internetwork device) aggregates or multiplexes traffic from a variety of lower speed user nodes 16 onto a higher speed trunk line 22 for connection into a switching network such as an ATM network 24. The communication links deployed between user nodes 13 and the access node 12 may typically be xDSL type links; where as the links between the access node 12 and the ATM network 24 may be higher speed links such as T3 or OC3 type links.

Within the access node 12-1 a number of internal port devices, such as line units 14-1, . . . 14-m each transmit and receive data to and from multiple user nodes 13. For example, the line unit 14-1 is connected to user nodes 13-1 through 13-n. The line units 14 and trunk units 16 are coupled over a cell bus 19 to the trunk units 16. The cell bus 19 thus provides for concentration of this traffic data in the form of cells for transfer over the higher speed trunk communication links into the ATM network 24. The line units 14 and trunk units 16 are called "units" here, although it should be understood that such internal port devices may be embedded as a single printed circuit card or line card. It should be also understood that there may be a much higher level of circuit integration, and the "units" may be integrated circuits.

As will be described more fully below, the cell traffic data travels between the line units 14 and trunk units 16 over the cell bus 19. However, an additional bus or interconnection, such as a backplane network 20, is also used to interconnect the line units 14 and trunk units 16 for carrying local management and control information. Thus, one or more controllers 18-1, 18-2 are connected to the line units 14 and trunk units 16 over this backplane network 20.

As illustrated, the ATM network 24 consists of a number of switching nodes 26-1, . . . 26-p. Each switch 26 is preferably a specialized computer that provides a facility for transferring data between source and destination nodes within the ATM network 24 in a manner which is well known. In the present illustration, one of the switches 26-p provides access to the Internet 27 for the system 10. In this manner, by connecting through a series of virtual channelings and virtual paths through the ATM network 24, via the connection over the cell bus 19, any given user node 13 may communicate with other nodes connected to the Internet 27.

Although the other present discussion of the network 10 assumes xDSL, ATM type network and Internet backbone access, it should be understood that the teachings herein may be applied to other types of communication networks 10 that make use of internetworking devices 12 to route and aggregate digital data traffic. For example, user nodes 13 might communicate with the line units 14 using any other type of suitable digital communication media and protocol such as T1, Ethernet, ISDN, or other suitable equipment.

The line units 14-1 and trunk units 16-1 are referred to herein collectively as "port devices" or the "locally controlled elements." However, it should be understood that these sub-assemblies in other contexts may constitute other devices. What is important is that these devices be of the type which the management entity 30 needs to control.

The management entity 30 is responsible for configuring all such internetwork devices 12. The cell multiplexer 12-1 is but one type of internetwork device 12 that may be deployed into the network 10 and managed by the management entity 30.

The management entity 30 includes responsibility for implementing management protocols that are designed to facilitate the exchange of certain types of management and control information between the managed internetwork devices 12. For example, the management entity 30 may use the Simple Network Management Protocol (SNMP), Telnet, or some other protocol for establishing connections over an Ethernet type management network 32.

The managed devices 12 may be any type of node residing in the network, including computer host, communication servers, printers, routers, bridges, hubs, multiplexers, and other internetwork devices. For example, a managed device 12 may communicate and keep track of the following: (1) number and state of its virtual circuits, (2) number and kinds of other messages received, (3) number of bytes and packets transferred into and out of the device, (4) maximum output queue length, broadcast messages sent and received, (5) network interfaces going down and coming up, and so forth, and (6) for end statistics from a user node 13.

A management entity 30 may communicate with the managed devices 12 via a higher level internetwork operating system software such as the Internetwork Operating System (IOS™) software from Cisco Systems Inc. of San Jose, California. Such software contains a sophisticated suite of networking capabilities that provide the intelligence necessary to link different types of internetwork devices together. For example, the management services provided by IOS include complete visibility to setup and configure the internetwork devices 12, monitor their activity, and administrate enabling network services for multicast, multimedia, and other communication application support, performance optimization for bandwidth management, load sharing and congestion control, and troubleshooting aids.

The present invention relates to a technique for configuring an individual one of the internetwork devices 12 and in particular a technique for configuring its network address not only on the management network 32 but also within the internal backplane network 20.

For example, a maintenance image may run on a controller 18-1 within the internetwork device 12. This maintenance and configuration image may contain fairly standard cell multiplexer software to load, configure, monitor, and control the line units 14 and trunk units 16. Such software may also establish traffic connections between particular ports on the line units 14 and trunk units 16.

In order for the line units 14 and trunk units 16 to communicate with the controller 18, the line units 14 and trunk cards 16 must be assigned in some manner their own controller backplane network 20 address. The present invention is therefore directed in particular to a technique for allowing the controller 18-1 to advertise an Internetwork Protocol (IP) layer address which the individual port devices 14 and 16 should use.

More specifically, the backplane network 20 is assumed to be a TCP/IP subnet having addressable internal devices. Thus, the controller 18-1 may periodically broadcast a message to advertise its own subnet address. The line units 14 and trunk units 16 then can determine their own IP addresses as a portion of the subnet address.

Figure 2:
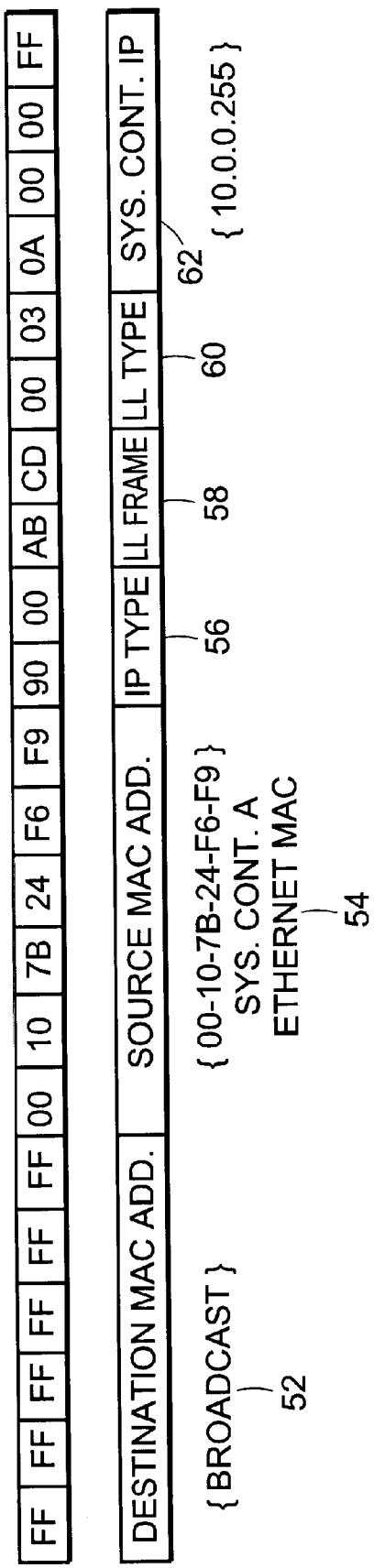
FIG. 2 is a detailed format of a broadcast message sent by the controller in order to advertise its subnet address to internal port interface devices.

An example of one type of broadcast message sent by a controller 18 to the line units 14 and trunk units 16 is shown in FIG. 2. This message may be in the form of an enhanced LINK_LOOP broadcast datagram containing the IP address of the current master system controller 18-1, . . . 18-n. The message includes a broadcast field 52, a source address field 54, an IP type field 56, an LL frame field 58, an LL type field 60, and system controller address field 62. In this case, the LINK_LOOP packet 50 has a destination media access control (MAC) address layer value of:

0xFF 0xFF 0xFF 0xFF 0xFF 0xFF indicating that the packet is a broadcast packet.

The source MAC address is:

00-10-7B-24-F6-F9 which is the Ethernet MAC layer address of the controller 18 which originated the message. The IP type field 56 indicates that the packet is an Ethernet LINK_LOOP packet and the LINK_LOOP frame field 58 indicates that pad octet bits are set to an easy-to-detect value such as 0xAB 0xCD.

The LINK_LOOP type field 60 indicates a value of 3 as

0x00 0x03 which is a proprietary value identifying this particular type of LINK_LOOP packet, e.g., broadcast of controller address information.

The system controller's Ethernet IP subnet address is given in the next field. In this example, it is set to 10.0.0.255 by indicating the hexadecimal values 0x0A 0x00 0x00 0xFF.

Figure 3:
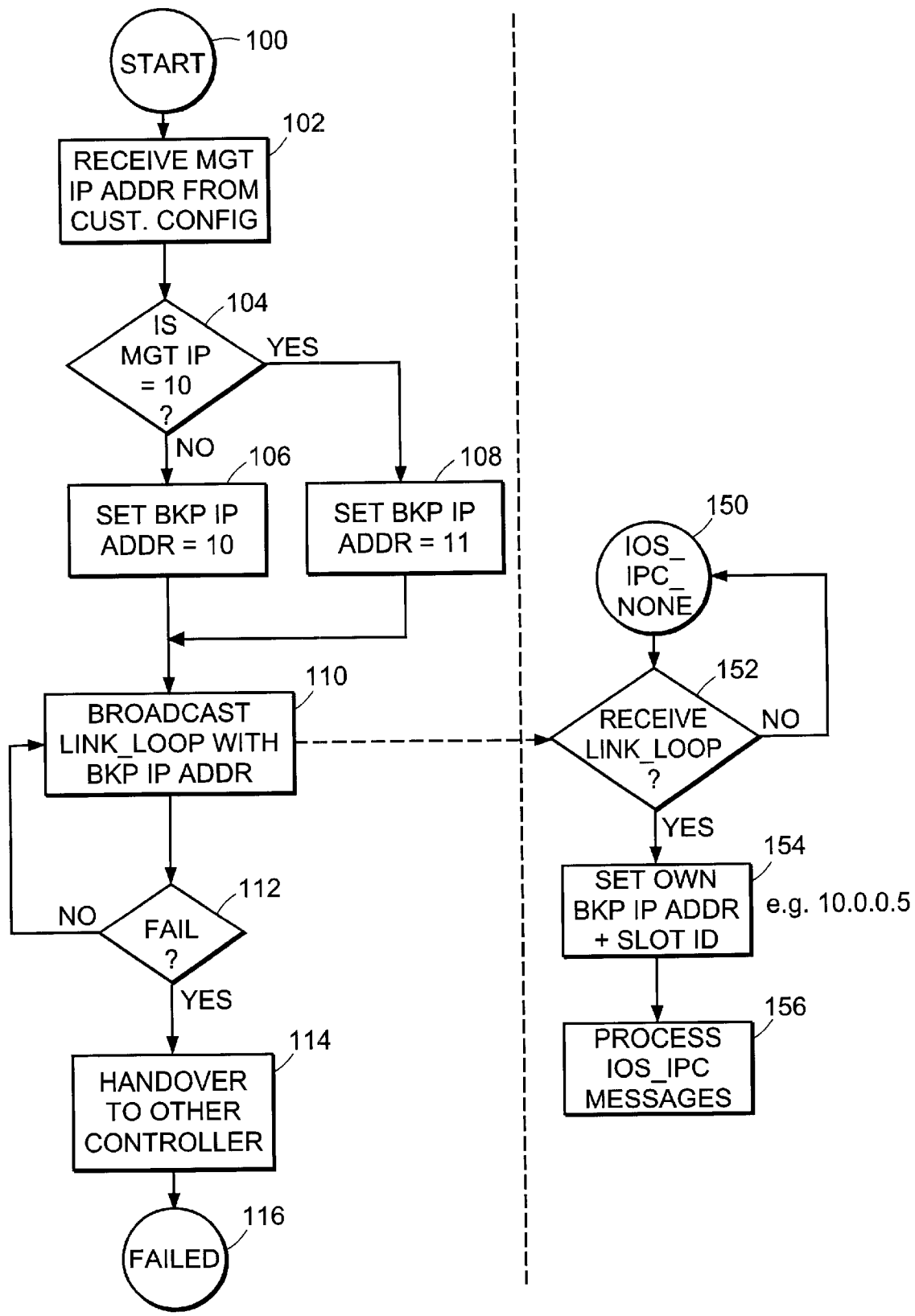
FIG. 3 is a flow diagram of a sequence of steps performed by a controller within the internetwork device to broadcast addresses to its internal port interface devices.

FIG. 3 sets forth the manner of determining an IP address for the devices connected to the internal backplane network 20, as well as an IP address for the controller 18-1 connected to the management network 32. Specifically, FIG. 3 illustrates a sequence of states entered into by both the controller 18 and one of the port units 14 or 16. The sequence of states entered into by the controller 18 are shown on the left-hand side of the figure, whereas those entered into by the line unit 14 or trunk unit 16 are shown on the right-hand side.

In a first start state 100, the controller, such as controller 18-1, enters a state 102 in which it receives a management IP layer address from a customer configuration input or other routine. Thus, the cell multiplexer 12-1 receives its IP address from the management entity 30 during a configuration process typical of any device connected to a network 32. This is the management IP address that the cell multiplexer 12-1 will recognize over the management network 32. This may typically originate with an operator input to the management entity 30, or some automatic process.

In the next state 104, the controller 18-1 then determines if this assigned management IP address is equal to a predetermined value. For example, if it is equal to "10," then a state 108 is entered in which a backplane IP address is set to a different value, such as "11." If, however, the management IP address was not set equal to 10, then the backplane IP address could be set to a default value such as 10.

In either case, the next state entered is state 110 in which the LINK_LOOP message as set forth in FIG. 2 is broadcast. This message includes the assigned backplane IP address. This state 110 may be entered into periodically by the controller, such as every 10 seconds. Also, while in this state 110, the backplane controller 18-1 periodically determines if a failure has occurred, such as in state 112. If this is not the case, then it continues sending the broadcast loop commands periodically in order to inform the devices connected to the backplane network 20 that a particular controller 18-1 is still operational.

If a failure mode is encountered, then the controller 18-1 enters a state 114 in which a handover is initiated to another controller, such as controller 18-2. This may be done in any number of ways convenient to the designer of the cell multiplexer 12. For example, this can be indicated by the cell multiplexer controller 18-1 and 18-2 exchanging fail safe signaling and/or messages in any number of known ways.

Finally, in state 116, upon completion of the handover signaling, the controller 18-1 enters a state 116 in which it remains in a failed state and discontinues broadcast of LINK_LOOP messages.

The sequence of states entered into by the line units 14 or trunk units 16 or other internal port unit is shown beginning in state 150. In this state, the device is in a state IOS_IPC_NONE in which it does not yet have an address. Upon receipt of a LINK_LOOP broadcast message in state 152, processing proceeds to a state 154 in which the port unit's own backplane IP address is set according to the received backplane IP address in the LINK_LOOP message.

For example, if the backplane IP address was set equal to 10, then the particular device's internal subnet 32 IP address can be set equal to 10.0.0.#, where # indicates a unique number which the unit can determine. For example, the unique number may consist of a slot number which can be read from the hardware where configuration of the unit to determine its position within a physical enclosure. Thus, for example, a line unit 14-2 inserted into a slot number 5 within the physical embodiment of the cell multiplexer 12-1 would assign itself an IP subnet address of 10.0.0.5.

In any event, now having assigned to itself a unique IP address, the line unit 14-2 can now participate in receiving and transmitting IOS IPC messages in the state 156.

It can be seen that once the handover process 114 occurs, for example, a controller 18-2 eventually assuming management responsibility, will itself enter state 106 or 108 where its own backplane IP address is broadcast to the line units 14 and trunk units 16. For example, the controller 18-2 may default to an IP address of 12, for example, rather than the default address of 10 for the controller 18-1. In this manner, there is an orderly handover and rendevous with the current controller in charge in a redundant configuration.

Once the line cards and trunk cards have configured their own IP addresses in state 154 based upon the message contents, they can then initiate the IOS IPC protocol on the backplane network 20 with the controller 18-1 and/or other line units 14 and trunk units 16 as required.

Now it can be understood how the controller 18 can determine a unique address for itself not only on the management network 32, but also on its own internal backplane network 20. This has a distinct advantage in preventing messages intended for one of the line units 14 or trunk units 16 from being sent out over the management network 32 and/or messages intended for other internetwork devices 12-2 connected to the management network 32 from being directed to entities within the cell multiplexer's own backplane network 20. This is accomplished by merely having a customer provision address for the network device 12-1 consistent with his or her own addressing scheme on the management network 32, alleviating the need for the customer to provision individual IP addresses for the. devices 14 and 16 and 18 on the backplane network 20 local to the internetwork device 12 itself.

The scheme also presents external network traffic from reaching line units 14 and trunk units 16, providing a security feature.

Furthermore, since the system controller 18-1 has no way of detecting which individual line card 14 is inserted into which individual slot, the controller's job of assigning addresses is also greatly alleviated. Indeed, the device each can figure their own addresses automatically. Line cards having discovered their own slot number can then determine their own addresses for the backplane network 20.

In addition, if the line cards do not hear a broadcast LINK_LOOP command within a certain period of time, they can enter a state 154 in which their return to the state IOS_IPC_NONE where they again wait to receive address information. For example, the received LINK_LOOP state 152 can be implemented as a test in which it is executed every so often and if received LINK_LOOP messages not received within a specified timeout window, the state 150 is automatically reentered into.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for assigning addresses to a managed internetwork device which itself includes a controller for controlling other managed devices comprising the steps of:

connecting the controller to a management network segment;

connecting the other managed devices to an internal network segment;

receiving an assigned address for the controller to use for communication on the management network segment;

determining a non-conflicting internal network address different from the assigned management network address for the controller;

broadcasting a control message to the other managed devices connected to the internal network segment, the control message containing the non-conflicting internal network address for the controller; and for at least one other managed device, receiving the broadcast control message and determining a device address using the non-conflicting internal network address.

2. A method as in claim 1 wherein the internal network addresses are Internet Protocol (IP) layer address.

3. A method as in claim 1 wherein the control message is broadcast as a LINK_LOOP datagram.

4. A method as in claim 1 wherein the non-conflicting address is assigned to be a default address unless the assigned address for the controller is the default address.

5. A method as in claim 1 additionally comprising the step of:

repeating the step of broadcasting a control message containing the non-conflicting address while the controller is operational.

6. A method as in claim 5 wherein the internetwork device contains a backup second controller, and upon handover of control to the backup second controller, the original controller stops repeating the step of broadcasting the control message.

7. A method as in claim 1 wherein the other managed devices are internal port units.

8. A method as in claim 1 wherein the internetwork device is an ATM multiplexer.

9. A method as in claim 1 wherein the step of determining a network address for the other managed device combines the subnet address from the broadcast message with local information unique to the other managed device.

10. A method as in claim 9 wherein the local information is a hardware configuration slot number.

11. In an internetwork device containing a number of port units interconnected by a backplane network, as well as a controller also connected to the backplane network to issue management and control commands to the port units, a management network interface for receiving management commands from management entities over a management network, a method for determining Internet Protocol (IP) addresses for the controller on both the management network and the backplane network that are unique, including a technique for determining individual IP addresses for the port units, comprising the steps of:

receiving an IP address assignment from a management entity over the management network;

selecting a first default network address for the controller or a second default network address for the controller which does not conflict with the address assigned to the controller over the management network; and broadcasting the backplane network IP address over the backplane network to the port interface devices.

12. A method as in claim 11 wherein the port units determine an IP address via concarenating a subnet address broadcast by the controller over the backplane network with an assigned slot number.

13. A method as in claim 11 wherein upon failure, the controller enters a failure state permitting a second controller to broadcast a new subnet address for the backplane network.

14. A method as in claim 11 wherein a subnet address for the management network is assigned to the controller by a customer.

* * * * *

UNITED STATES PATENT AND TRADEMARK OFFICE
CERTIFICATE OF CORRECTION

PATENT NO.   : 6,470,013 B1
DATED        : October 22, 2002
INVENTOR(S)  : David R. Barach, John A. DeNisco and Robert J. Goguen It is certified that error appears in the above-identified patent and that said Letters Patent is hereby corrected as shown below:

Column 10,
Line 4, delete "concarenating" and insert -- concatenating --.

Signed and Sealed this

Fourth Day of March, 2003

JAMES E. ROGAN
*Director of the United States Patent and Trademark Office*